United States Patent
Sun et al.

(10) Patent No.: US 6,927,971 B2
(45) Date of Patent: Aug. 9, 2005

(54) GROUND ELASTIC STRAP FOR COMPACT FLASH HOUSING

(75) Inventors: Chin-Jung Sun, Taipei (KR); Chi-Chan Huang, Taipei (KR); Tung-Kai Tsai, Taipei (KR); Shien-Chang Lin, Taipei (KR)

(73) Assignee: North Star Systems Corp., Taipei (TW)

(*) Notice: Subject to any disclaimer, the term of this patent is extended or adjusted under 35 U.S.C. 154(b) by 141 days.

(21) Appl. No.: 10/635,550

(22) Filed: Aug. 7, 2003

(65) Prior Publication Data

US 2005/0030704 A1 Feb. 10, 2005

(51) Int. Cl.7 .................................................. G06F 1/16
(52) U.S. Cl. ..................................... 361/683; 361/816
(58) Field of Search .............................. 361/679, 683, 361/686, 799, 800, 816, 818

(56) References Cited

U.S. PATENT DOCUMENTS 3,797,617 A * 3/1974 Clement ...................... 191/49
3,860,031 A * 1/1975 Grilli .......................... 406/183
5,480,323 A * 1/1996 Mews et al. ................. 439/395
6,629,644 B2 * 10/2003 Yeh ............................. 235/492

OTHER PUBLICATIONS

Brandt et al. (US 2004/0171300 A1), "Socket Connector for Receiving a Plurality of Termination Sockets for Coaxial Cables", Sep. 2, 2004.*

* cited by examiner

Primary Examiner—Yean-Hsi Chang
(74) Attorney, Agent, or Firm—Troxell Law Office, PLLC

(57) ABSTRACT

A ground elastic strap for a compact flash card housing, for serving as a ground elastic strap of a connector inserted by a compact flash card, or inserted into a host housing, includes corresponding left and right elastic protruding pieces, so as to come into contact with a metal housing of a compact flash card when the compact flash card is inserted. The ground elastic strap is able to function as a ground structure for ground connection of the compact flash card, and to further prevent electro static discharge (ESD), thereby increasing stability of the compact flash card when transmitting data with a host connected.

5 Claims, 6 Drawing Sheets

GROUND ELASTIC STRAP FOR COMPACT FLASH HOUSING

BACKGROUND OF THE INVENTION (a) Field of the Invention

The invention relates to a ground elastic strap for a compact flash housing, and more particularly, to a ground elastic strap for uses of an inserted connector or a base housing of a compact flash card. The ground elastic strap is a conductor made of a metal alloy. When the compact card is being inserted, using elasticity of the metal alloy and a structural design of elastic protruding pieces, the ground elastic strap is enabled to function as a design for preventing electro static discharge by having the compact flash card come into contact with a metal housing of the compact flash card.

(b) Description of the Prior Art

Grounding is a crucial task in electronic products, and especially in connection signal transmissions of electronic connectors, stability requirement of transmissions is even more exacting. Therefore, connecting terminals or compact flash cards for computer peripherals are not provided with related designs of grounding structures.

A common compact flash card (generally referred as a CF card) is consisted of corresponding metal upper and lower housings, and is provided with a flash memory, related circuits and a connector base at an interior thereof. Grounding means of compact flash cards are divided into two categories: one uses connecting terminals for ground connection, and the other employs the metal housing thereof as guidance when inserted into a connector or a host, and ground connection is completed via terminals or a ground strap.

For that signal transmissions between the a compact flash card and a connector is completed using connection of connecting terminals, the signal transmissions are highly liable to be affected by interferences coming from the signals or traveling routes of electronic circuit terminals, and signal distortions and attenuations are often resulted. Hence, to clearly distinguish between ground connections and signal transmissions, most of current compact flash cards adopt metal housings for ground connection guidance.

However, as described above, for current connection terminals in connector and host housings, connecting terminals are used as ground connections that are then guided and conducted to the host housings. To be more specific, there are no other available structural designs provided for compact flash cards using the metal housings as ground guidance thereof.

SUMMARY OF THE INVENTION

The primary object of the invention is to provide a ground elastic strap for a compact flash housing and capable of being quickly assembled into an insertion slot of a host housing and further coming into contact with a metal housing of the compact flash card inserted, so as to serve as a ground structure for elevating ground accuracy of the compact flash card.

The secondary object of the invention is to provide a ground elastic strap that can be quickly assembled to a connector and further come into contact with a metal housing of a compact flash card inserted, so as to serve as a ground structure without changing configurations of connecting terminals of a prior connector or designs of molds.

The other object of the invention is to provide a ground elastic strap for a compact flash housing, and the ground elastic strap is capable of independent and integrated implementations of a structure thereof without making alterations to prior host housings.

DETAILED DESCRIPTION OF THE PREFERRED EMBODIMENTS

To better understand the technical contents of the invention, detailed descriptions of two preferred embodiments shall be given with the accompanying drawings hereunder.

Figure 1:
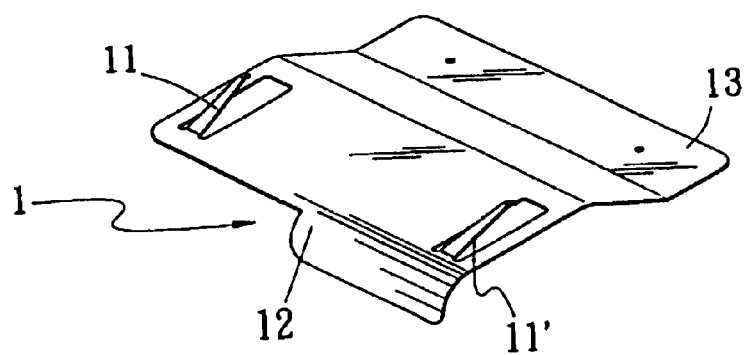
FIG. 1 shows an elevational view of the ground elastic strap according to the invention.
Figure 2:
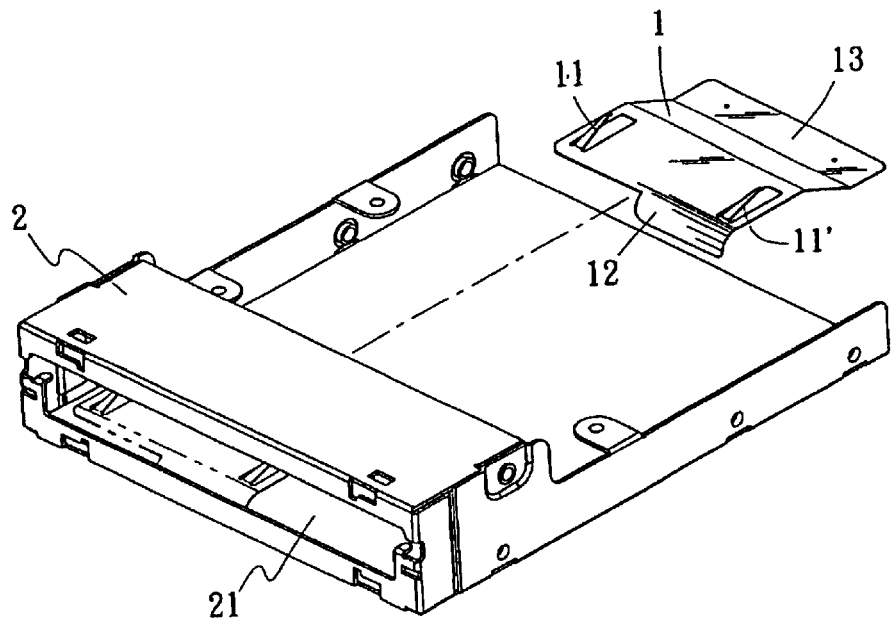
FIG. 2 shows an elevational view illustrating the ground elastic strap according to the invention being disposed to a host housing.
Figure 3:
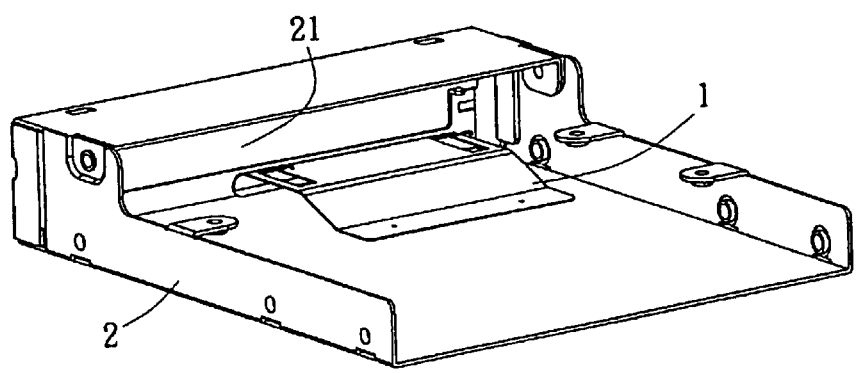
FIG. 3 shows another elevational view illustrating the ground elastic strap according to the invention being disposed to a host housing.

Referring to FIGS. 1 to 3 showing ground elastic strap 1 in a preferred embodiment according to the invention, the ground elastic strap 1 of a compact flash card is formed by stamping and shearing a metal alloy. A front edge is of the ground elastic strap 1 is formed with an arched induction portion 12 acting as guidance when a compact flash card is inserted. Top side portions of the ground elastic strap 1 are formed with elastic protruding pieces 11 and 11' having a spacing distance corresponding to a width of the compact flash. A rear portion of the ground elastic strap 1 is formed with a connection portion 13 for connecting and fastening to a host housing 2.

Figure 4:
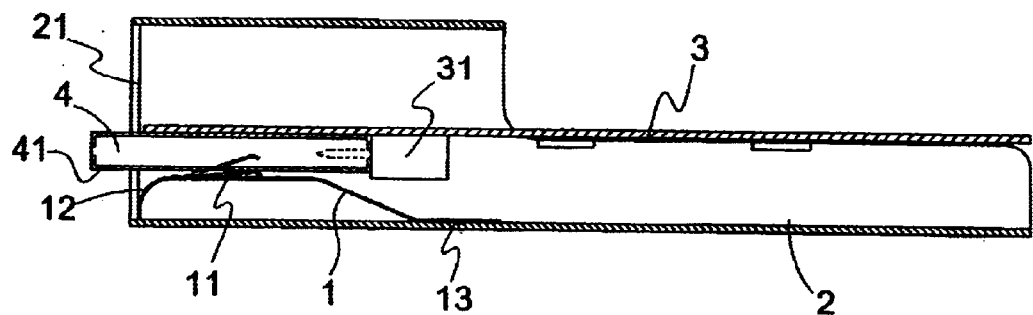
FIG. 4 shows a longitudinal sectional view illustrating the ground elastic strap according to the invention being disposed to a host housing.

The host housing 2 is provided with a portal slot 21 at a front edge thereof, and the portal slot 21 is for accommodating a card reader element of a compact flash card. According to the invention, the ground elastic strap 1 is provided at a bottom side portion of the portal slot 21. Referring to FIG. 4, a compact flash card 4 is corresponded with the portal slot 21 of the host housing 2 when inserted, and is connected with a connector 31 of a motherboard 3. Wherein, the compact flash card 4 is consisted of a pair of corresponding upper and lower metal housings 41. Hence, when the connector 31 is inserted and connected, the metal housings 41 are butted against the elastic protruding pieces 11 after passing through the induction portion 12 of the ground elastic strap 1, and completes ground connection with the host housing 2 using guidance of the metal housings 41.

Figure 5:
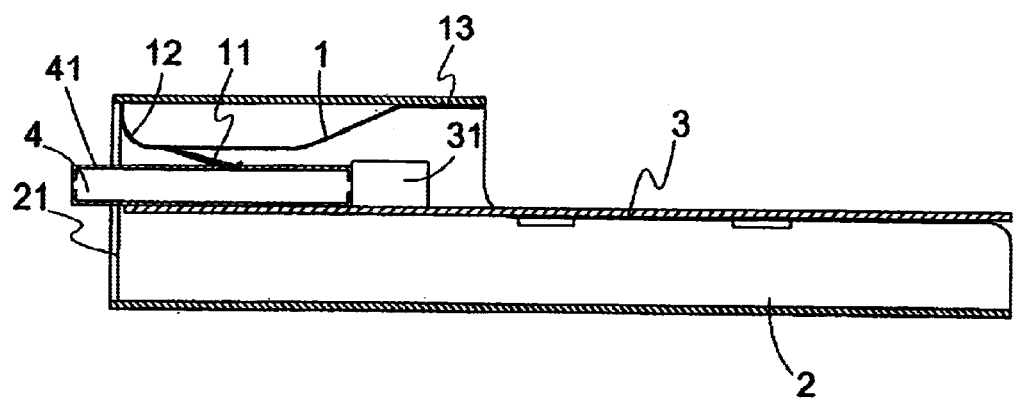
FIG. 5 shows a longitudinal sectional view illustrating the ground elastic strap according to the invention being disposed to a top portion of a host housing.

In addition, referring to FIG. 5 showing another embodiment of the ground elastic strap 1 according to the invention, the ground elastic strap 1 is disposed at a top side portion of the portal slot 21 of the host housing 2, and is for corresponding with the connector 31 provided above the motherboard 3. When the compact flash card 4 is inserted above the motherboard 3, the elastic protruding pieces 11 of the ground elastic strap 1 are also butted against the metal housings 41, and similarly complete ground connection of the ground elastic strap 1 via guidance of the host housing 2.

Figure 6:
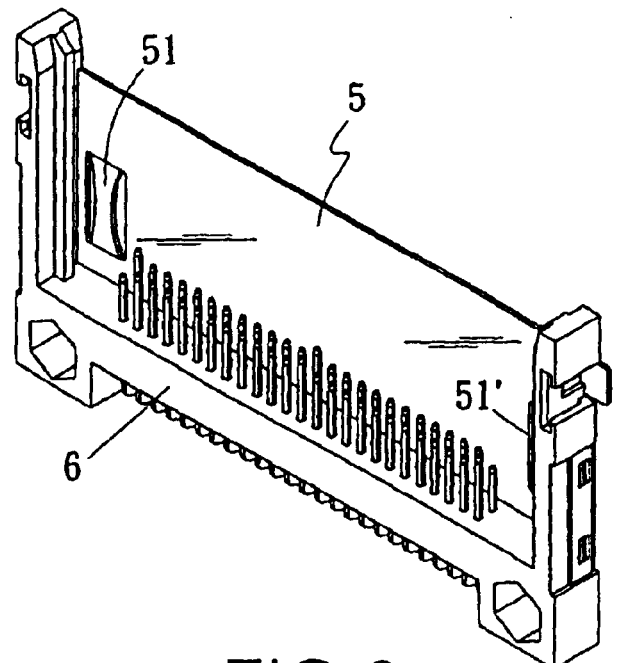
FIG. 6 shows an elevational view illustrating the ground elastic strap in another embodiment according to the invention being disposed to a connector.
Figure 7:
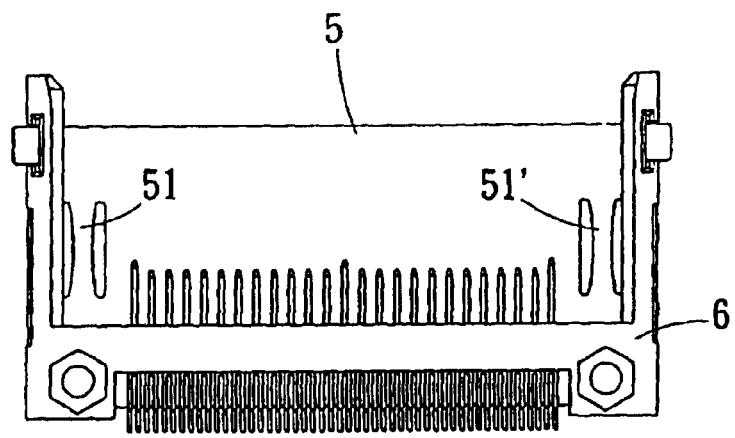
FIG. 7 shows a front view illustrating the ground elastic strap in another embodiment according to the invention being disposed to a connector.
Figure 8:
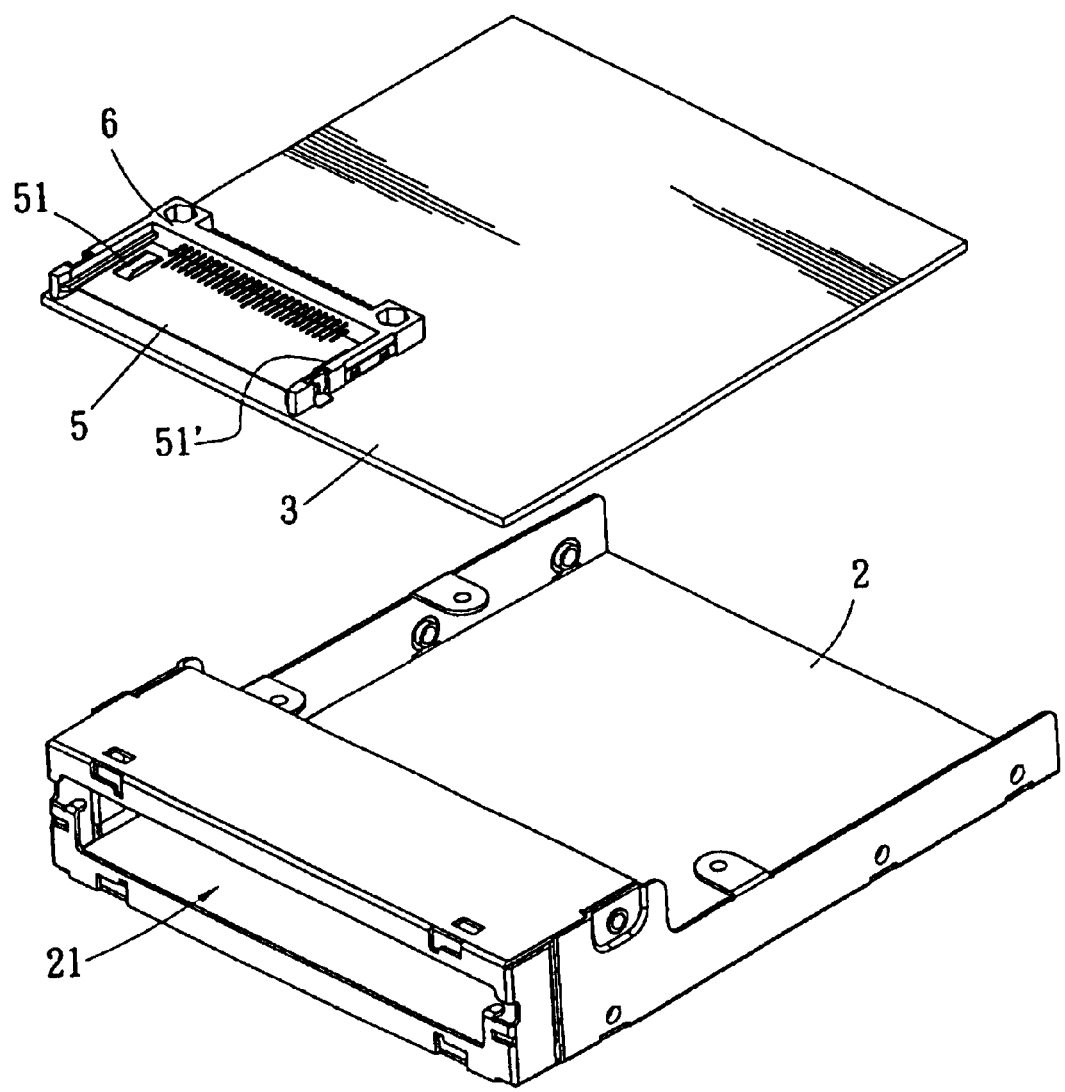
FIG. 8 shows an elevational schematic view illustrating a ground elastic strap according to the invention being disposed to a connector assembled to a host housing.

Referring to FIGS. 6, 7 and 8 showing the ground elastic strap for a compact flash card in yet another embodiment according to the invention, a ground elastic strap 5 is disposed at a side portion of a seat of a connector 6. The ground elastic strap 5 is similarly formed by stamping and shearing a metal alloy, and two sides thereof are disposed with arched protruding portions 51 and 51, respectively. The arched protruding portions 51 have a spacing distance in between for coordinating with a width of the metal housings 41 of the compact flash card 4.

Figure 9:
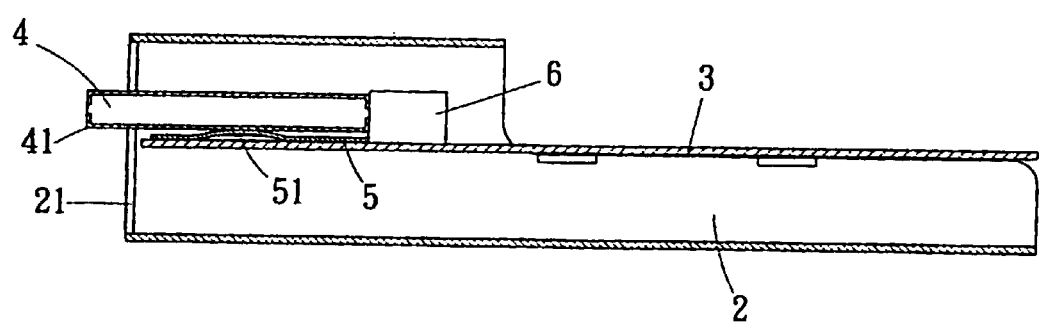
FIG. 9 shows a longitudinal sectional view illustrating a ground elastic strap according to the invention being disposed to a connector assembled to a host housing.

In this embodiment, when fastening the connector 6 to the motherboard 3, the ground elastic strap 5 is simultaneously fastened therein without requiring alterations in designs of the host housing 2. Referring to FIG. 9, when the compact flash card 4 is inserted and fastened to the connector 6 via the portal slot 21, the arched protruding portions 51 of the ground elastic strap 5 provided below the connector 6 are butted against the metal housings 41 of the compact flash 4, thereby completing ground connection. The above description illustrates the ground elastic strap 5 as another embodiment according to the invention.

Conclusive from the above, the appeal of the ground elastic strap for a compact flash card housing according to the invention is targeted at coming into contact with the metal housings 41 of the inserted compact flash card 4, and thus for serving as a guidance structure for ground connection. Therefore, without requiring changes in molds of the prior host housing 2, the ground elastic strap 1 can be independently integrated into the host housing 2. Furthermore, the invention also provides another structural design for the ground elastic strap 5, which, without requiring alterations in configurations of connecting terminals and mold designs of the prior connector 6, is capable of reducing production cost and increasing ground stability of the compact flash card 4. Hence, the invention is indeed an advanced and practical structural design.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A ground elastic strap for a compact flash card housing, for serving as a ground elastic strap of a connector inserted by a compact flash card, or inserted into a host housing, and comprising the characteristics of:

a ground elastic strap form from stamping and shearing a metal alloy, having appropriate elasticity for ground guidance, formed with an induction portion at a front edge thereof and a connection portion at a rear end thereof, and provided with corresponding elastic protruding pieces at right and left sides of a top portion thereof; wherein, the elastic protruding pieces are for contacting with a metal housing of a compact flash card, and for serving as ground connection of the compact flash card.

2. The ground elastic strap for a compact flash card housing in accordance with claim 1, wherein the two corresponding elastic protruding pieces have a spacing distance in between for coordinating with a width of the metal housing of the compact flash card.

3. The ground elastic strap for a compact flash card housing in accordance with claim 1, wherein the two corresponding elastic protruding pieces are arched protruding portions.

4. The ground elastic strap for a compact flash card housing in accordance with claim 1, wherein the connection portion of the ground elastic strap is connected to the host housing using rivets or welding.

5. The ground elastic strap for a compact flash card housing in accordance with claim 1, wherein the connection portion of the ground elastic strap is connected to the connector using rivets or welding.

* * * * *